(12) United States Patent
Conte et al.

(10) Patent No.: US 7,583,132 B2
(45) Date of Patent: Sep. 1, 2009

(54) CHARGE PUMP CIRCUIT

(75) Inventors: Antonino Conte, Tremestieri Etneo (IT); Carmelo Ucciardello, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 216 days.

(21) Appl. No.: 11/779,631

(22) Filed: Jul. 18, 2007

(65) Prior Publication Data

US 2008/0278222 A1 Nov. 13, 2008

(30) Foreign Application Priority Data

Jul. 19, 2006 (EP) .................................. 06425497

(51) Int. Cl.
*G05F 3/02* (2006.01)
(52) U.S. Cl. ..................................................... 327/536
(58) Field of Classification Search ......... 327/534–537, 327/390, 589
See application file for complete search history.

(56) References Cited

U.S. PATENT DOCUMENTS

| | | | |
|---|---|---|---|
| 6,154,096 A * | 11/2000 | Chien | 331/17 |
| 6,476,666 B1 * | 11/2002 | Palusa et al. | 327/536 |
| 6,788,130 B2 * | 9/2004 | Pauletti et al. | 327/536 |
| 7,098,725 B2 * | 8/2006 | Lee | 327/536 |
| 7,256,640 B2 * | 8/2007 | Ucciardello et al. | 327/536 |
| 2004/0239409 A1 | 12/2004 | Jang et al. | |
| 2005/0213781 A1 | 9/2005 | Suzuki et al. | |

OTHER PUBLICATIONS

Partial European Search Report, Application No. EP 06 42 5497.2 (Filing Date: Jul. 19, 2006), The Hague, Apr. 17, 2007 (2 Pages).

* cited by examiner

*Primary Examiner*—Lincoln Donovan
*Assistant Examiner*—Hai L Nguyen
(74) *Attorney, Agent, or Firm*—Lisa K. Jorgenson; Stephen Bongini; Fleit Gibbons Gutman Bongini & Bianco P.L.

(57) ABSTRACT

A latch-type charge pump circuit is provided having first and second charge pump stages interconnected by an intermediate circuit node. The charge pump circuit includes first pump capacitors respectively coupled between first and second enable terminals and respective first inner circuit nodes, second pump capacitors respectively coupled between the second and first enable terminals and respective second inner circuit nodes, latch transistors coupled between each of the first and second inner circuit nodes and the intermediate circuit node, and a stabilization circuit having at least one stabilization stage coupled between the intermediate circuit node and the first and second enable terminals and connected to control terminals of the latch transistors for supplying them with suitable control signals so as to ensure their correct turn-on and turn-off during a charge sharing period of the charge pump circuit.

19 Claims, 16 Drawing Sheets

CHARGE PUMP CIRCUIT

CROSS-REFERENCE TO RELATED APPLICATIONS

This application is based upon and claims priority from European Patent Application No. 06 425 497.2, filed Jul. 19, 2006, the entire disclosure of which is herein incorporated by reference.

FIELD OF THE INVENTION

The present invention relates to a charge pump circuit, and more specifically to a latch-type charge pump circuit that includes at least one first and one second charge pump stage.

BACKGROUND OF THE INVENTION

Charge pump circuits are widely used in a lot of electronic devices for obtaining voltage values higher than the supply voltage by using capacitors as charge storage elements.

A classic charge pump circuit comprises four capacitors suitably connected to four enable signals (or phases) of the charge pump circuit.

It is known that a four-phase charge pump circuit is able to operate in a range of frequencies equal to 10-50 MHz. However, such a range is insufficient for many applications, in particular for those applications where it is essential to save area since an increase in the phase frequency allows a reduction of the sizes of the pump capacitors, and thus the area occupied by the circuit as a whole.

FIG. 1 shows a known latch-type charge pump circuit.

The charge pump circuit 1 has an input terminal IN connected to a first voltage reference, in particular the supply voltage Vdd, and an output terminal OUT connected to a load, which is represented in the figure by a load capacitor CL connected in parallel with a load current generator IL between the output terminal OUT and a second voltage reference, in particular ground GND.

The charge pump circuit 1 has N charge pump stages CB1 to CBN connected in cascade between the input IN and output OUT terminals, and connected to first FX and second FN enable terminals that respectively supply first and second enable signals (or phases), which for simplicity are likewise indicated with the references FX and FN. In particular, the enable signals (or phases) FX and FN are complementary to one another.

The charge pump circuit 1 is thus a two-phase circuit, able to operate at quite high frequencies (e.g., 100 MHz and more), due to the presence of suitable latch circuits L1 to LN in each charge pump stage.

In more detail, each charge pump stage CBj comprises at least one first CUp and at least one second CDown pump capacitor connected between the first enable terminal FX and a first inner circuit node Up and between the second enable terminal FN and a second inner circuit node Down, respectively.

Each pump charge stage CBj also comprises a respective latch circuit Li including low voltage transistors connected between the first Up and second Down inner circuit nodes. In particular, each latch circuit Li comprises at least one pair of N-channel MOS transistors and at least one pair of P-channel MOS transistors, suitably connected so as to form opposite pairs of CMOS switches having control (or gate) terminals connected to the enable terminals FX and FN for the switched connection (and the relative charge sharing) of the pump capacitors CUp and CDown, respectively.

For a better understanding of the operation of the latch-type charge pump circuit 1 reference will be made to the simplified diagram of FIG. 2, in which only a first CB1 and a second CB2 charge pump stage are shown.

The charge pump stages CB1 and CB2 are placed in parallel and work with each other in phase opposition, with the enable signals (or phases) FX and FN being, at any time, complementary to one another. Thus, for example, when the first phase FN is high (for example, it has a voltage value near the supply voltage Vdd), the second phase FX is low (for example, it has a voltage value near ground GND).

In more detail, the first charge pump stage CB1 comprises a first pump capacitor CUp1 connected between the first enable terminal FX and a first inner circuit node Up1, a second pump capacitor CDown1 connected between the second enable terminal FN and a second inner circuit node Down1, and a first latch circuit L1 connected between the first Up1 and second Down1 inner circuit nodes and connected to an input terminal IN and to an intermediate circuit node INT.

In particular, the first latch circuit L1 comprises a first N-channel MOS transistor $M_{NU1}$ and a second P-channel MOS transistor $M_{PU1}$ having common bulk and drain terminals, being connected in series between the input terminal IN and the intermediate circuit node INT, and having their control (or gate) terminals connected to each other and to the second inner circuit node Down1 so as to form a first CMOS switch. The first latch circuit L1 also comprises, in a dual way, a third N-channel MOS transistor $M_{ND1}$ and a fourth P-channel MOS transistor $M_{PD1}$ having common bulk and drain terminals, being connected in series between the input terminal IN and the intermediate circuit node INT, and having their control (or gate) terminals connected to each other and to the first inner circuit node Up1 so as to form a second CMOS switch.

In a similar way, the second charge pump stage CB2 comprises a third charge pump capacitor CUp2 connected between the second enable terminal FN and a third inner circuit node Up2, a fourth pump capacitor CDown2 connected between the first enable terminal FN and a fourth inner circuit node Down1, and a second latch circuit L2 connected between the third Up2 and fourth Down2 inner circuit nodes and connected to the intermediate circuit node INT and to the output terminal OUT.

In particular, the second latch circuit L2 comprises a fifth N-channel MOS transistor $M_{NU2}$ and a sixth P-channel MOS transistor $M_{PU2}$ having common bulk and drain terminals, being connected in series between the intermediate circuit node INT and the output terminal OUT, and having their control (or gate) terminals connected to each other and to the fourth inner circuit node Down2 so as to form a third CMOS switch. The second latch circuit L2 comprises, in a dual way, a seventh N-channel MOS transistor $M_{ND1}$ and an eighth P-channel MOS transistor $M_{PD1}$ having common bulk and drain terminals, being connected in series between the intermediate circuit node INT and the output terminal OUT, and having their control (or gate) terminals connected to each other and to the third inner circuit node Up1 so as to form a fourth CMOS switch.

Under these conditions, the fourth transistor $M_{PD1}$ of the first latch circuit L1 and the seventh transistor $M_{ND2}$ of the second latch circuit L2 are on and allow a charge sharing between the second and fourth pump capacitors Cdown1 and Cdown2, and thus charge sharing between the third pump capacitor Cup2 and the output terminal OUT, while the second transistor $M_{PU1}$ of the first latch circuit L1 and the fifth transistor $M_{NU2}$ of the second latch circuit L2 are off. In other words, these transistors act as pass-transistors for the charge sharing carried out by the charge pump circuit 1.

The voltage value VInt on the intermediate circuit node INT is maintained practically constant during the whole clock period, as shown in FIG. 3. This figure illustrates the typical pattern of voltage signals VCDown1 and VCDown2 at the inner circuit nodes Down1 and Down2 of the stages CB1 and CB2, together with the voltage signal Vint on the intermediate circuit node INT.

The widening of the operating frequency range allows a reduction of the sizes of the charge pump capacitors CUp and CDown, and thus of the area occupied.

However, the use of these same charge pump capacitors CUp and CDown for the turn-on and turn-off of the latch circuit transistors allows a significant circuit simplification to be obtained for the charge pump circuit 1, but also constitutes a limit of the latch circuits current supply, in particular when the supply voltage Vdd approaches the threshold voltage of the transistors in these latch circuits or when the charge pump circuit 1 is made to supply a higher and higher current value.

When the supply voltage Vdd decreases, the charge pump circuit 1 does not succeed in supplying a sufficient load current IL, as shown in FIG. 4. This figure shows the current-voltage characteristic [I-V] of the known charge pump circuit 1 for a supply voltage value Vdd equal to 1V. In particular, it shows how the I-V characteristic of the charge pump circuit 1 falls for output voltage Vout values higher than 4V.

For overcoming this limit, it is possible to increase the sizes of the transistors contained in the latch circuits and the charge pump capacitors CUp and CDown so as to meet the required specifications. However, this nullifies the simplicity of the charge pump circuit 1.

Moreover, it is possible to experimentally verify that it is not possible to obtain sufficient values of the load current IL for several applications, in particular in those circuits in which the supply voltage is near the threshold voltage of the transistors, also over-sizing the charge pump circuit 1.

This limit has become more and more problematic during recent years due to the trend of having lower and lower supply voltages.

SUMMARY OF THE INVENTION

An object of the present invention is to overcome the limits and drawbacks affecting the known circuits, and to provide a charge pump circuit having such structural and functional characteristics as to allow its correct operation at low supply voltages, such as below 1V.

Another object of the present invention is to provide a charge pump circuit having a stabilization circuit connected to the enable terminals for ensuring a correct basing of the transistors in the latch circuits during periods of charge sharing.

One embodiment of the present invention provides a latch-type charge pump circuit having at least one first charge pump stage coupled to at least one second charge pump stage by an intermediate circuit node. The charge pump circuit includes a first pump capacitor coupled between a first enable terminal and a first inner circuit node, a second pump capacitor coupled between a second enable terminal and a second inner circuit node, a third pump capacitor coupled between the second enable terminal and a third inner circuit node, a fourth pump capacitor coupled between the first enable terminal and a fourth inner circuit node, a first latch transistor coupled between the first inner circuit node and the intermediate circuit node, a second latch transistor coupled between the second inner circuit node and the intermediate circuit node, a third latch transistor coupled between the third inner circuit node and the intermediate circuit node, a fourth latch transistor coupled between the fourth inner circuit node and the intermediate circuit node, and a stabilization circuit having at least one stabilization stage coupled between the intermediate circuit node and the first and second enable terminals. The at least one stabilization stage is coupled to control terminals of the first, second, third, and fourth latch transistors for supplying these latch transistors with suitable control signals so as to ensure correct turn-on and turn-off during a charge sharing period of the charge pump circuit.

Another embodiment of the present invention provides an integrated circuit that includes at least one such charge pump circuit.

The characteristics and the advantages of charge pump circuits according to the present invention will be apparent from the following description given by way of indicative and non-limiting example with reference to the annexed drawings.

DETAILED DESCRIPTION OF PREFERRED EMBODIMENTS

The present invention is particularly, but not exclusively, suited to a charge pump circuit of the two-phase latch type. The following description is made with reference to this type of circuit for simplifying the description only.

To understand the mechanisms underlying the limitation of the current supplied by the known latch-type charge pump circuit, first the potential difference values between its several inner circuit nodes will be analyzed under the different operating conditions of the circuit.

Figure 1:
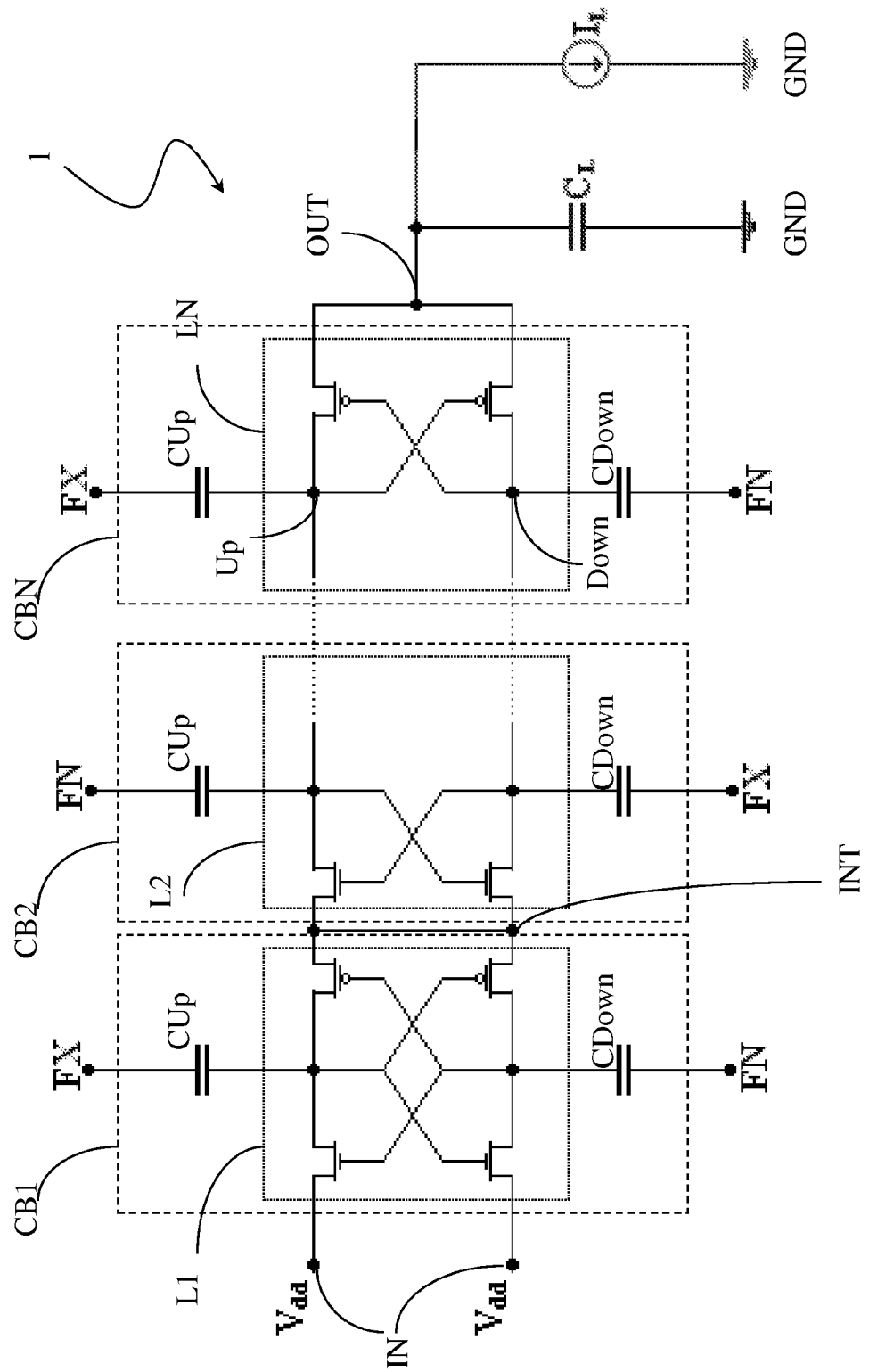
FIGS. 1 and 2 show a known latch-type charge pump circuit.
Figure 2:
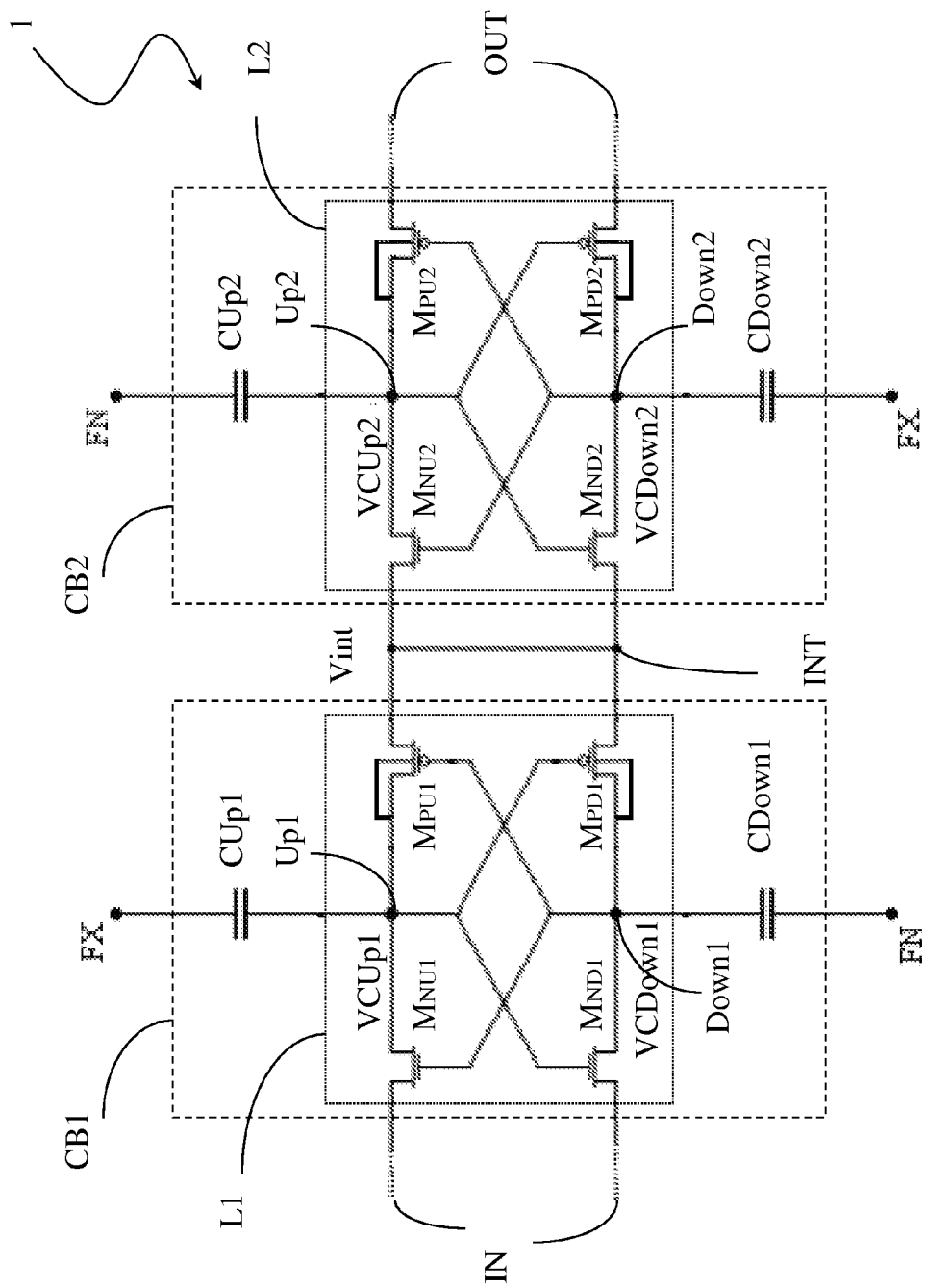
Figure 3:
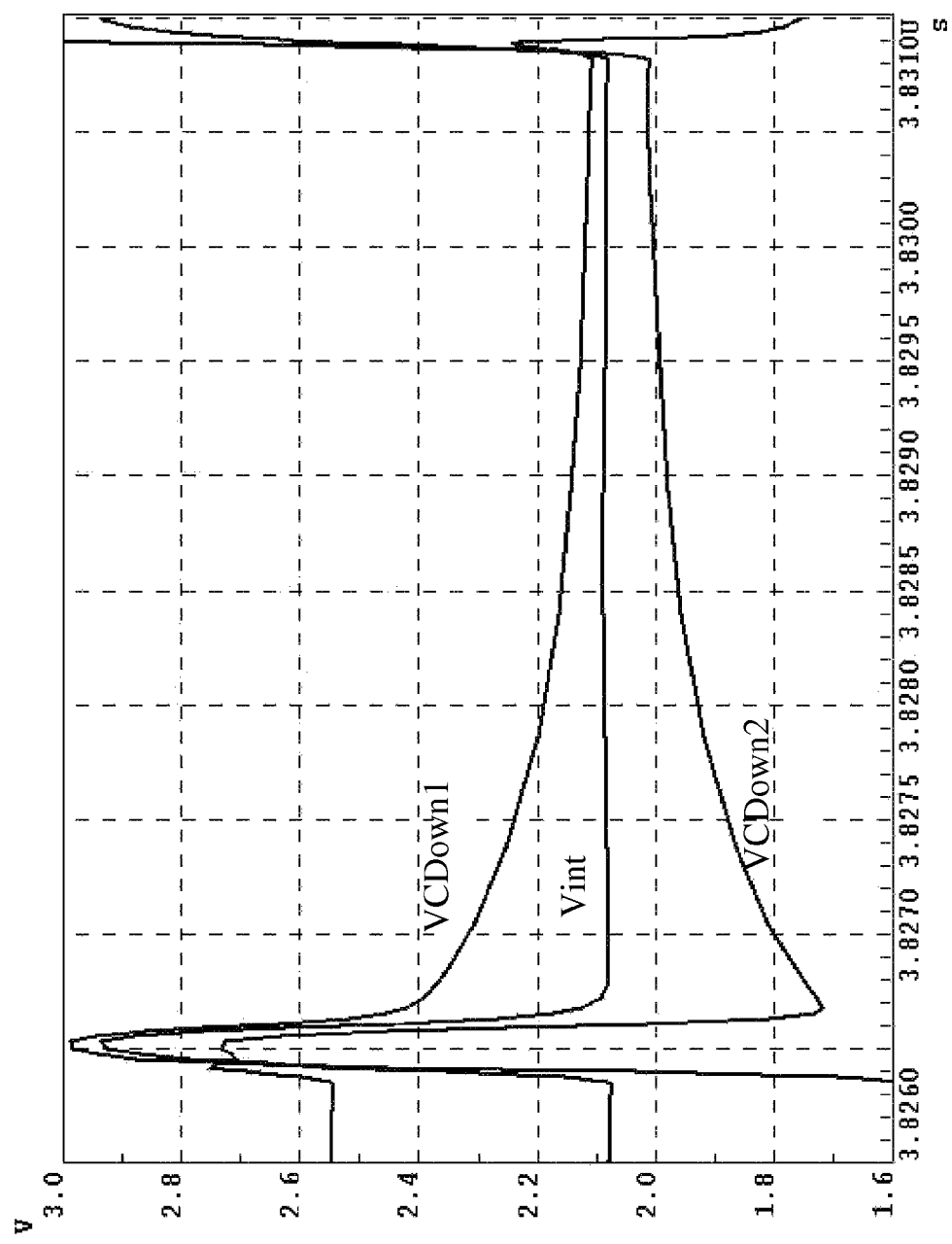
FIGS. 3 and 4 show signals inside the charge pump circuit of FIG. 2.

For simplicity of illustration, reference is made to a simplified scheme similar to the one of FIG. 2 (i.e., to a charge pump circuit comprising at least two charge pump stages, with a generic charge pump stage being indicated as CBj).

Figure 5B:
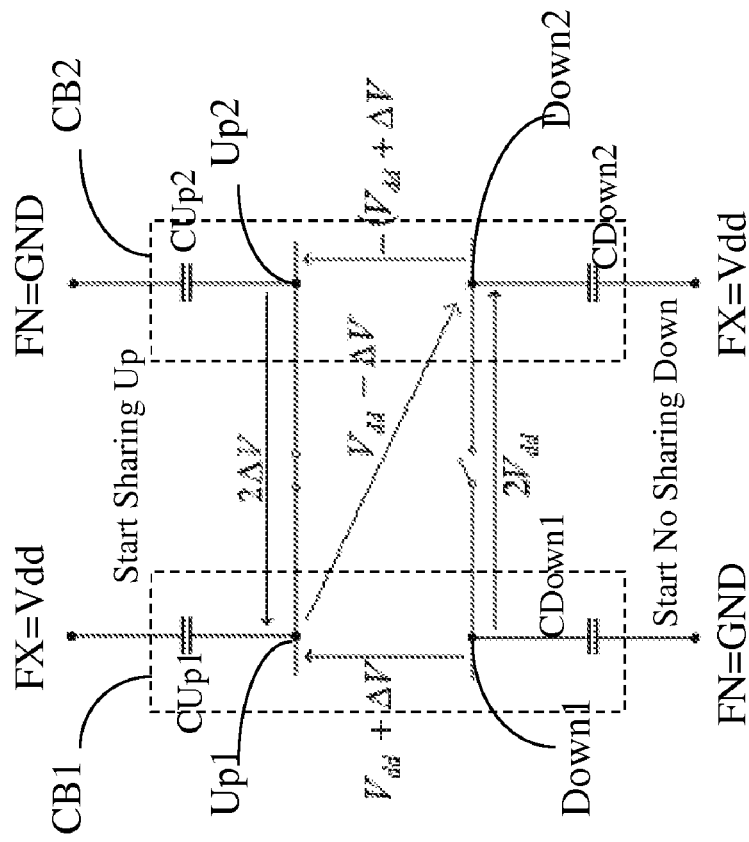
FIGS. 5A-5D shows functional schemes of the circuit of FIG. 2.
Figure 5A:
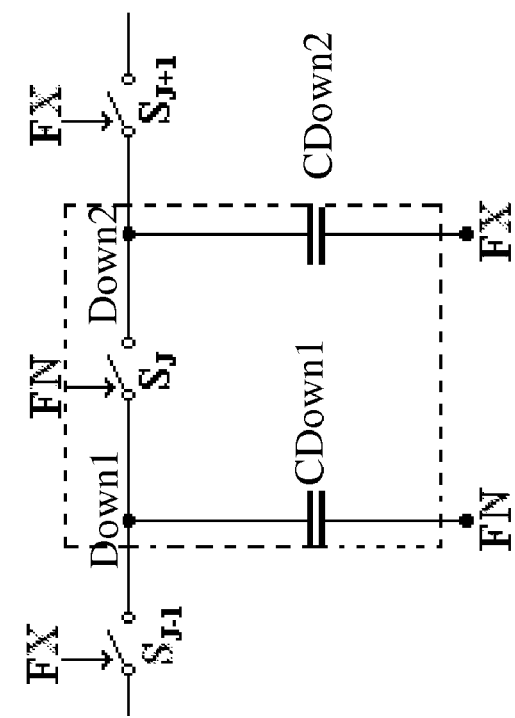

A first operating condition, the simplest and most intuitive one, is that of charge sharing end ("End Sharing"), as shown in FIG. 5A, where the voltage difference between the nodes Up and Down is obviously void.

$$V_{UpDown_{End\_Sh}} = 0V \qquad (1)$$

All the CMOS switches of this charge pump stage CBj, just as of the stages preceding it (j−i) and following it (j+1), are open, as shown in this figure.

During the sharing, the voltage at the node Up is reduced by an amount equal to:

$$\Delta V \left( \Delta V = \frac{I_L T}{C} \right) \quad (2)$$

while the voltage at the node Down grows by the same amount. Thus at the beginning of the sharing, it results that:

$$V_{UpDown_{Start\_Sh}} = 2\Delta V \quad (3)$$

In particular, starting from the moment of sharing end, the phases FX and FN switch and, as a consequence, the voltage at the node Up decreases below the supply voltage value Vdd, while the voltage at the node Down increases by the same amount.

Thus, in a no sharing semi-period ("No Sharing") of the stage j, the potential difference value between its nodes Up and Down is equal to:

$$V_{UpDown_{Start\_NoSh}} = 2Vdd \quad (4)$$

In this charge no sharing semi-period for the stage j, the adjacent stages (j−1) and (j+1) are, in reality, under charge sharing conditions and the first pump capacitor Cup connected to the node Up of the stage j thus receives charge from the one of the preceding stage (j−1) and the second pump capacitor CDown connected to the node Down of the stage j gives charge to the one of the successive stage (j+1).

At the end of the charge no sharing semi-period for the stage j, the voltage at the node Up is thus increased by ΔV while the voltage at the node Down is reduced by ΔV, obtaining:

$$V_{UpDown_{End\_NoSh}} = 2Vdd - 2\Delta V \quad (5)$$

The conditions analyzed above are, for convenience, summarized in Table 1.

TABLE 1

| Difference of potential between the nodes Up and Down | Operating condition stage j |
|---|---|
| $V_{UpDown_{End\_Sh}} = 0\ V$ | Sharing end between Up and Down |
| $V_{UpDown_{Start\_NoSh}} = 2\ Vdd$ | Non-sharing start between Up and Down |
| $V_{UpDown_{End\_NoSh}} = 2\ Vdd - 2\Delta V$ | Non-sharing end between Up and Down |
| $V_{UpDown_{Start\_Sh}} = 2\Delta V$ | Sharing start between Up and Down |

Figure 5D:
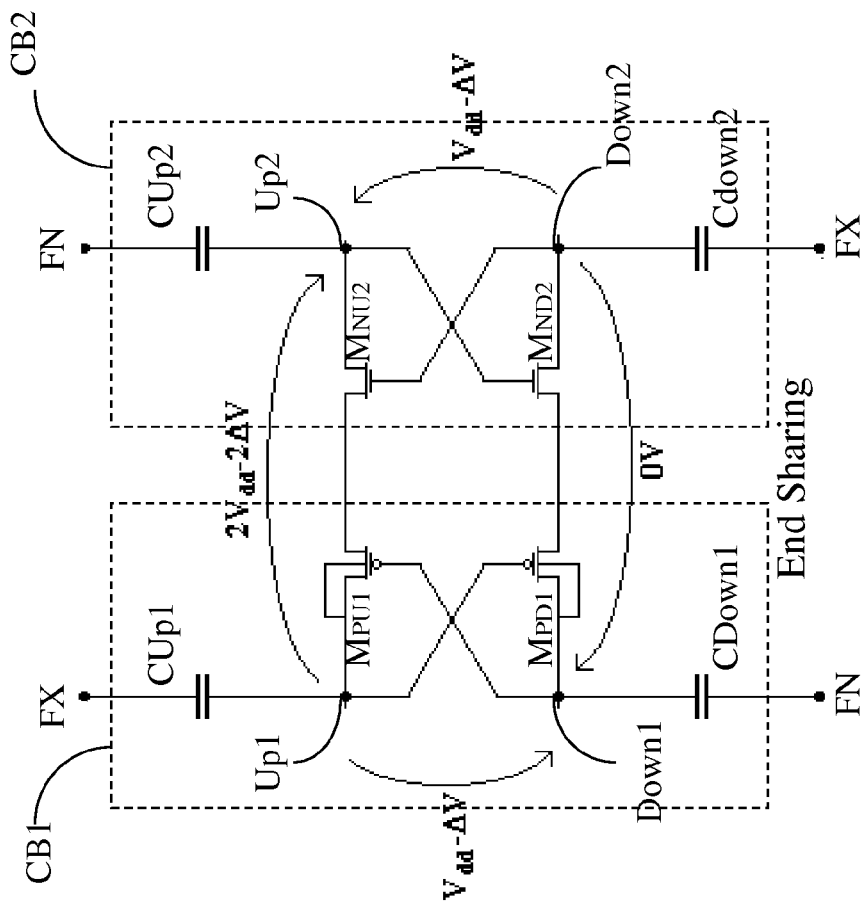
Figure 5C:
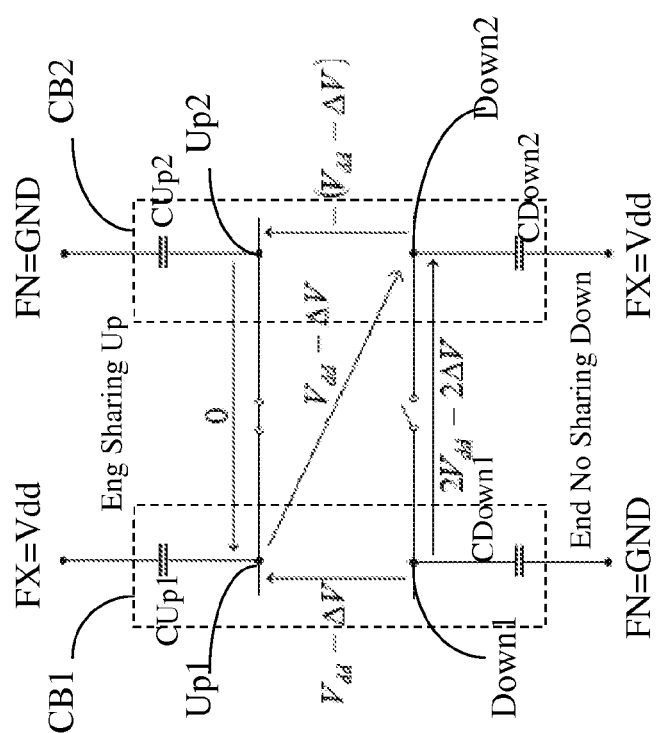

In particular, considering the interaction between two charge pump stages CB1 and CB2 operating in phase opposition, with the enable voltages (or phases) taking the values of the supply voltage Vdd and ground GND (although these values are not meant to be limiting) it is possible to evaluate the differences of potential between the two nodes Up and Down during the operation as shown in FIGS. 5B and 5C, so as to obtain the following.

Under the Start Sharing Up and Start No Sharing Down conditions for FX=Vdd and FN=GND, as shown in FIG. 5B, it follows that: the voltage difference between the nodes Up1 and Up2 is equal to 2ΔV, these nodes being connected to a closed switch; the voltage difference between the nodes Up1 and Down1 is equal to Vdd+ΔV; the voltage difference between the nodes Down1 and Down2 is equal to 2Vdd, these nodes being connected to an open switch; and the voltage difference between the nodes Up2 and Down2 is equal to −(Vdd+ΔV).

Under the End Sharing Up and End No Sharing Down condition for FX=Vdd and FN=GND, as shown in FIG. 5C, it follows that: the voltage difference between the nodes Up1 and Up2 is equal to 0V, these nodes being connected to a closed switch; the voltage difference between the nodes Up1 and Down1 is equal to Vdd−ΔV; the voltage difference between the nodes Down1 and Down2 is equal to 2Vdd−2ΔV, these nodes being connected to an open switch; and the voltage difference between the nodes Up2 and Down2 is equal to −(Vdd−ΔV).

Reconsidering the pass-transistors of the latch circuits of the charge pump stages, as shown in FIG. 5D, it occurs that, for a correct operation of this charge pump circuit, it is necessary that these transistors remain on during all the semi-period in which the charge sharing between the relative charge pump stages takes place. Thus, it is necessary that the following condition is met.

$$V_{dd} - \Delta V \geq |V_{th}| \quad (6)$$

Figure 6:
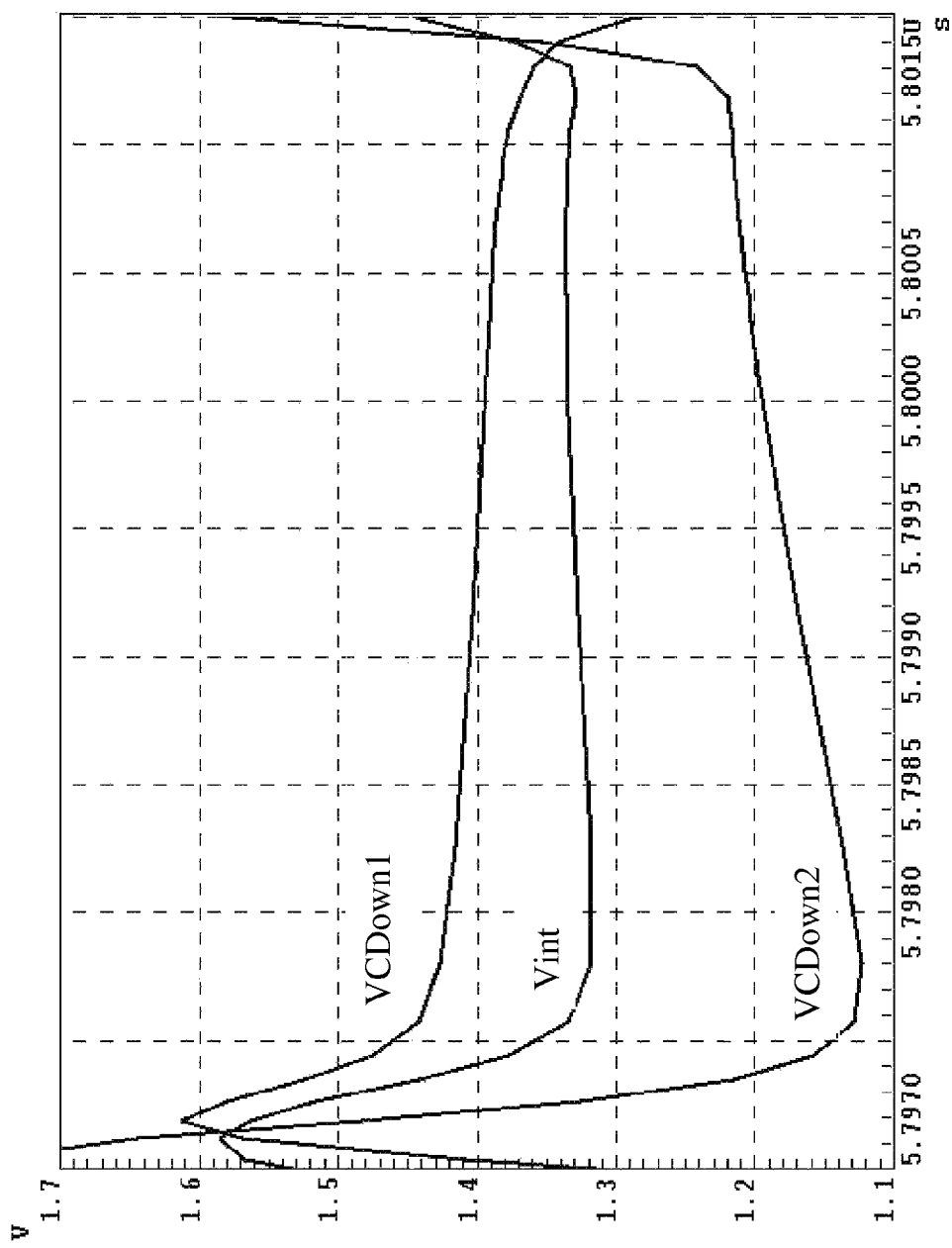
FIG. 6 shows signals inside the circuit of FIG. 2 under charge sharing operating conditions.

Both when the supply voltage Vdd decreases and when the supplied current increases, as already shown, this condition becomes more and more difficult to ensure, and the transistors are turned off before the charge sharing is completed, so as to obtain a significant degradation of the supplied current, as shown in FIG. 6, in particular relative to a supply voltage value Vdd=1V.

Figure 4:
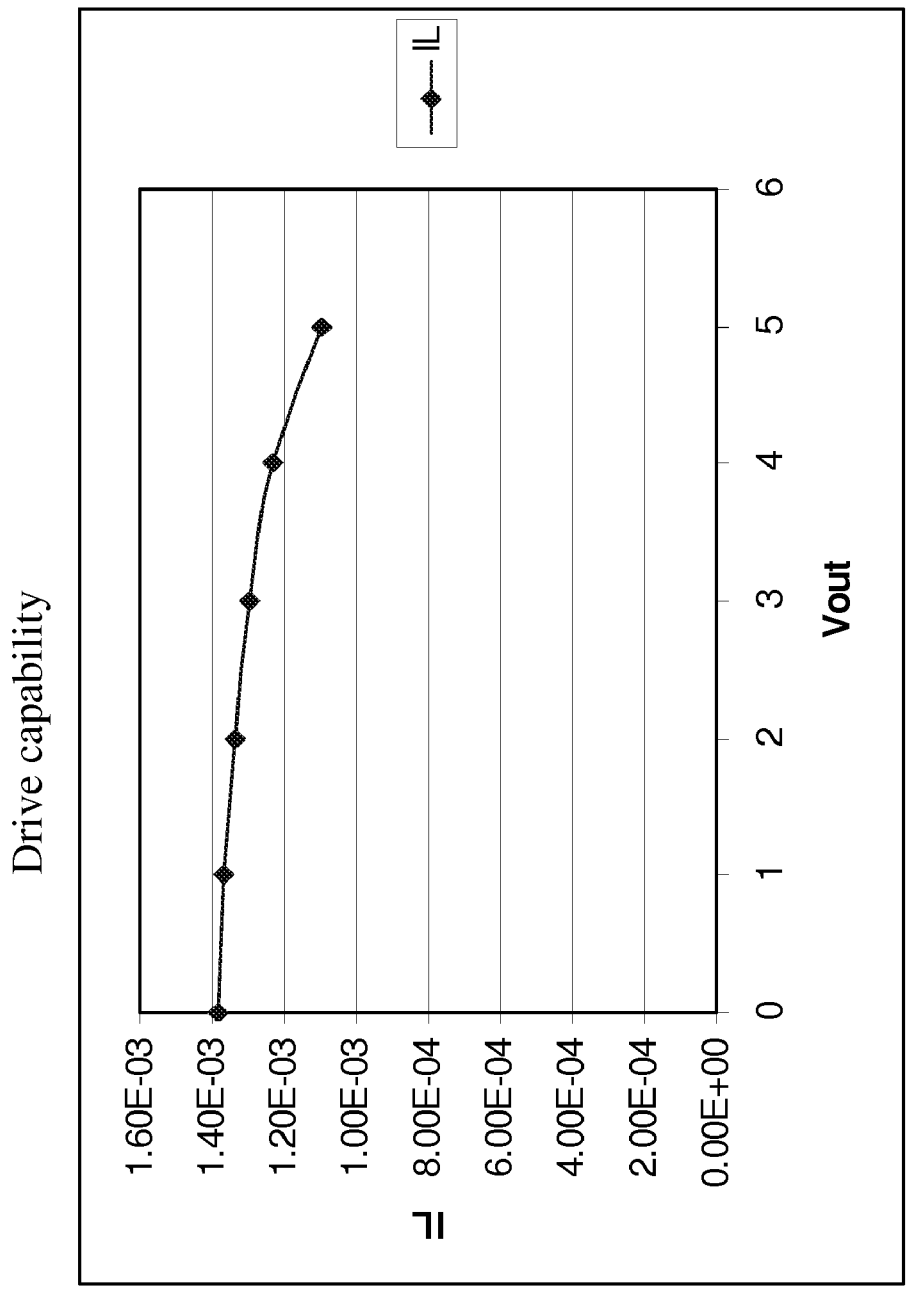

In this case, the current and output voltage characteristic loses its linearity and no longer follows the rule:

$$V_{out} = (N+1)V_{dd} - N\frac{I_L}{C_p f} \quad (7)$$

which is typical of the charge pump stages, as already shown in FIG. 4.

In fact, it occurs that the known latch-type charge pump circuit exploits the voltages at the nodes Up and Down where the pump capacitors are connected for turning on and off the transistors in the latch circuits connected to these nodes. These voltages are not, however, constant during the charge sharing periods, but vary during each Sharing and No Sharing start and end semi-period, reducing the biasing of the control (or gate) terminals of these transistors, until they are completely turned off as previously explained.

In substance, the problem of the known latch-type charge pump circuit arises from the fact that with the potentials at stake it is not possible to correctly turn on the transistors of the latch circuits in the charge pump stages, in particular the pass-transistors which realize the passage of charge from one charge pump stage to the successive one inside the circuit when the supply voltage values approach the threshold voltage values of these transistors, in particular at 1V.

Figure 7:
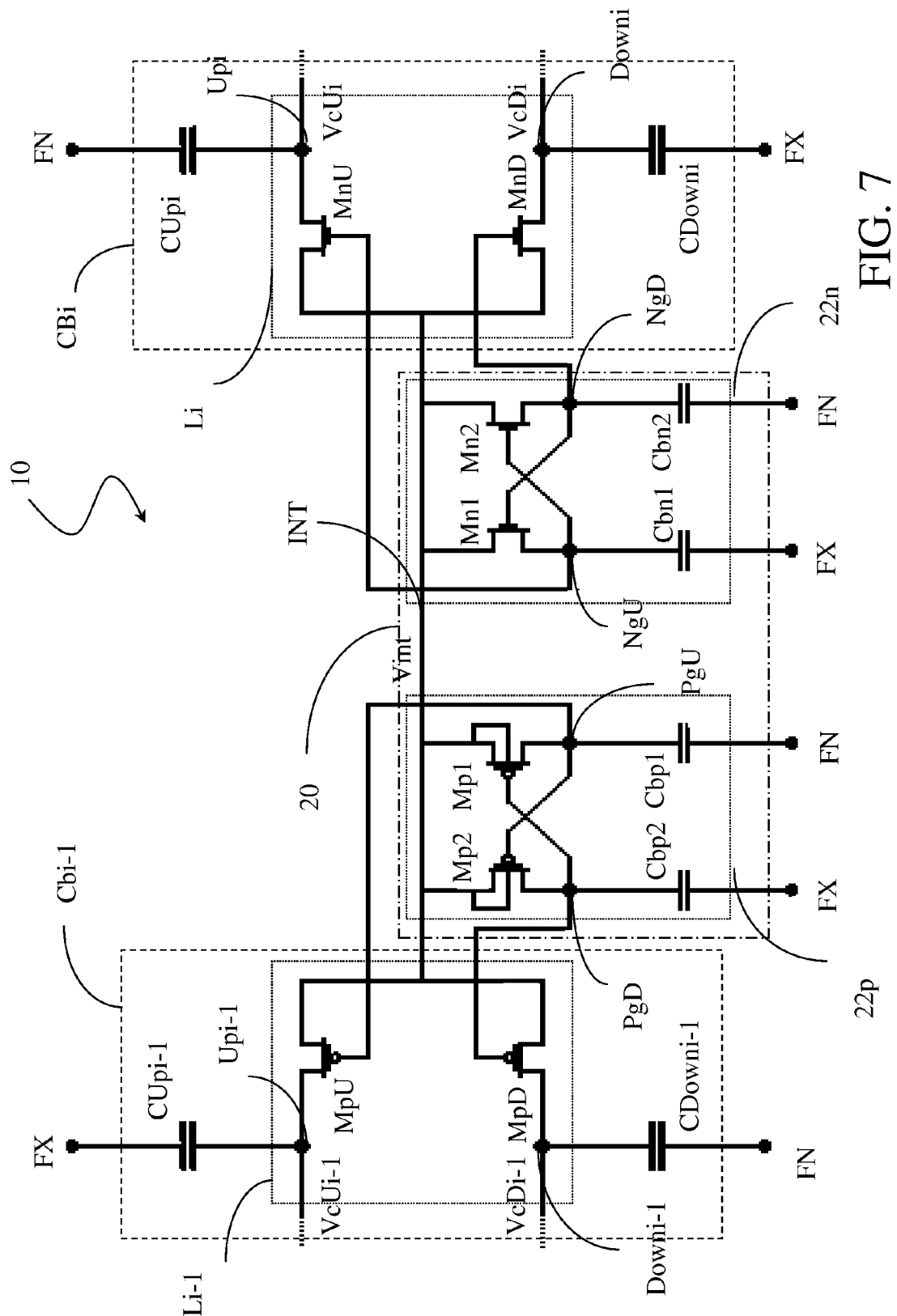
FIG. 7 shows a charge pump circuit according to one embodiment of the present invention.

FIG. 7 shows a latch-type charge pump circuit with a stabilization circuit according to one embodiment of the present invention.

In this embodiment, the stabilization circuit is provided in the charge pump circuit 10 to maintain constant the biasing voltages applied to the control (or gate) terminals of the transistors in the latch circuits of the charge pump stages during a charge sharing semi-period, so as to ensure their correct turn-on and turn-off.

The stabilization circuit of this embodiment comprises a plurality of stabilization stages in each charge pump stage that are connected to an intermediate circuit node Int, as well as to the enable terminals FX and FN.

For simplicity of illustration, reference will be made hereafter to a charge pump circuit 10 comprising first CBi-1 and second CBi charge pump stages. As described above in connection with the known circuit, each charge pump stage CB is connected between first FX and second FN enable terminals that respectively receive enable signals (or phases), which are also designated as FX and FN. These phases are complementary to one another (the stages are driven in phase opposition). Each charge pump stage CB comprises at least one first CUp and at least one second CDown pump capacitor (the suffixes i-1 and i indicate corresponding elements of the charge pump stages CBi-1 and CBi). The phases Fx and Fn can take a high value (for example corresponding to the supply voltage Vdd), and a low value (for example corresponding to ground GND); it is to be understood that these values are not meant to be limiting, any voltage values can be used that respect the following limitations: they have to be higher than the threshold voltage of the transistors, so as not to slip back into the problem described in connection with the known circuit, and lower than the maximum voltage bearable by the transistors of the technology that is used, for avoiding their breakage.

In particular, the first pump capacitor CUp is connected between the first enable terminal FX and a first inner circuit node Up, and the second pump capacitor CDown is connected between the second enable terminal FN and a second inner circuit node Down.

Each charge pump stage CB also comprises a latch circuit L connected between the first Up and second Down inner circuit nodes, and connected to an intermediate circuit node INT. The latch circuit L comprises suitable transistors for realizing a switch or pass-transistor function.

For simplicity of illustration, FIG. 7 only shows the transistors involved in the charge sharing between the stages. In particular, a first transistor MpU of the latch circuit Li-1 of the first charge pump stage CBi-1 is connected between the intermediate circuit node INT and the first inner circuit node UPi-1 of this first stage CBi-1, and has a first control terminal PgU that corresponds to the gate terminal of the first transistor MpU. A second transistor MpD of the latch circuit Li-1 of the first charge pump stage CBi-1 is connected between the intermediate circuit node INT and the second inner circuit node Downi-1 of this first stage CBi-1, and has a second control terminal PgD that corresponds to the gate terminal of the second transistor MpD. A third transistor MnU of the latch circuit Li of the second charge pump stage CBi is connected between the intermediate circuit node INT and the first inner circuit node UP1 of this second stage CBi, and has a third control terminal NgU that corresponds to the gate terminal of the third transistor MnU. A fourth transistor MnD of the latch circuit Li of the second charge pump stage CBi is connected between the intermediate circuit node INT and the second inner circuit node Downi of this second stage CBi-1, and has a fourth control terminal NgD that corresponds to the gate terminal of the fourth transistor MnD.

The transistors in the latch circuits of the charge pump stages essentially function as switches for allowing the charge sharing between corresponding pump capacitors (i.e., connected to the nodes Up, or Down).

In the exemplary embodiment of FIG. 7, the first and second transistors MpU and MpD of the latch circuit Li-1 of the first charge pump stage CBi-1 are P-channel MOS transistors, while the third and the fourth transistors MnU and MnD of the latch circuit Li of the second charge pump stage CBi are N-channel MOS transistors.

According to this embodiment of the present invention, the charge pump circuit 10 also comprises a stabilization block connected between the intermediate circuit node INT and the enable terminals FX and FN, and connected to the control (or gate) terminals of the transistors of the latch circuits L inside the charge pump stages.

In particular, the stabilization circuit comprises a plurality of stabilization stages, connected between pairs of consecutive charge pump stages, with a single exemplary stabilization stage 20 being shown in FIG. 7 in which only two charge pump stages are shown.

Suitably, each stabilization stage 20 comprises at least one first 22p and at least one second 22n biasing portion suitably connected to the transistors of the latch circuit L of the charge pump stages.

In particular, the first biasing portion 22p comprises a first biasing capacitor Cbp1 connected between the first control terminal PgU and the second enable terminal FN, a second biasing capacitor Cbp2 connected between the second control terminal PgD and the first enable terminal FX, a first control transistor Mp1 connected between the intermediate circuit node INT and the first control terminal PgU and having a control (or gate) terminal connected to the second control terminal PgD, and a second control transistor Mp2 connected between the intermediate circuit node INT and the second control terminal PgD and having a control (or gate) terminal connected to the first control terminal PgU.

In a similar way, the second biasing portion 22n comprises a third biasing capacitor Cbn1 connected between the third control terminal NgU and the first enable terminal FX, a fourth biasing capacitor Cbp2 connected between the fourth control terminal NgD and the second enable terminal FN, a third control transistor Mn1 connected between the intermediate circuit node INT and the third control terminal NgU and having a control (or gate) terminal connected to the fourth control terminal NgD, and a fourth control transistor Mn2 connected between the intermediate circuit node INT and the fourth control terminal NgD and having a control (or gate) terminal connected to the third control terminal NgU.

Suitably, the first and second control transistors Mp1 and Mp2 are of the same type as the first and second transistors MpU and MpD of the latch circuit Li-1 of the first charge pump stage CBi-1 (i.e., they are P-channel MOS transistors in this embodiment), while the third and fourth control transistors Mn1 and Mn2 are of the same type as the third and fourth transistors MnU and MnD of the latch circuit Li of the second charge pump stage CBi (i.e., they are N-channel MOS transistors in this embodiment).

As previously seen, the voltage signal Vint at the intermediate circuit node INT remains constant and is used for correctly driving the turn-on and turn-off of the latch transistors. Moreover, VcU and VcD also indicate the voltage signals at the nodes Up and Down, respectively, of each charge pump stage CB. Furthermore, also in this case the phases FX and FN are, at any time, complementary to one another.

It is possible to distinguish two different operating conditions that are equivalent to each other.

FN=Vdd, FX=0, VcDi-1 goes high and VcUi-1 goes low, VcDi is low while VcUi is high. In this case, the node PgU goes high (to a value equal to Vint) while the node PgD goes low (in particular, by an amount equal to Vdd with respect to Vint), thus turning on the transistor MpD and turning off the transistor MpU. In the same semi-period, the node NgD goes high (by an amount equal to Vdd with respect to Vint) and the node NgU goes low. Thus, the transistor MnD is turned on, while the transistor MnU is turned off. In this way, the charge sharing between the two adjacent pump capacitors connected to the terminals Downi-1 and Downi is obtained, while it is prevented between the two adjacent pump capacitors connected to the terminals Upi-1 and Upi.

FN=Vdd, FX=0: In this case the charge pump circuit 10 operates in a fully similar way to the previous situation.

Advantageously with this embodiment of the present invention, during the two semi-periods in which the nodes PgD, PgU, NgD, and NgU go high or low, they remain, for all the time of the sharing, always constant, and at such a voltage as to allow an efficient turn-on and turn-off of the transistors in the latch circuits and connected thereto.

In more detail, to understand the operation of the charge pump circuit 10 according to this embodiment of the present invention, there will first be considered the beginning of a charge sharing step between the pump capacitors connected to the nodes Up of the charge pump stages, thus with the first phase FX at Vdd and the second phase FN at zero.

During this period, the latch transistors connected to the nodes Up (i.e., the first transistor MpU and the third transistor MnU) must be well on, while those connected to the nodes Down) (i.e., the second transistor MpD and the fourth transistor MnD) must be well off so as not to favor any charge return.

Advantageously, according to this embodiment of the present invention, the stabilization stage 20 of the charge pump circuit 10 creates potentials that are not only capable of driving the control terminals of the latch transistors in an efficient way, but especially capable of doing it during all the sharing period.

In fact, during this sharing period, the potentials obtained remain constant, which did not occur for the known charge pump circuit.

Considering the charge sharing condition of the capacitors connected to the nodes Up, it occurs that, at the start of the sharing period, when the phase FX goes to Vdd, the node PgD, which previously was at Vint-Vdd, now rises and goes to Vint. This value makes the second latch transistor MpD turn off just as the first control transistor Mp1.

With regard to the node PgU, in the preceding period it had gone to Vint while now, since the phase FN has decreased to zero, it goes to Vint−Vdd. This value makes the first latch transistor MpU turn on just as the second control transistor Mp2.

For the node NgU, it was at the value Vint and goes to Vint+Vdd, allowing the turn-on of the third latch transistor MnU and, in a corresponding way, the fourth control transistor Mn2.

Finally, the node NgD that had previously gone to the value Vint+Vdd is discharged through the fourth control transistor Mn2 to the value Vint, causing the turn-off of the fourth latch transistor MnD and the third control transistor Mn1.

The potential values obtained with the charge pump circuit 10, during a sharing of the capacitors connected to the nodes Up, can be summarized as shown in Table 2.

TABLE 2

| PgD | Vint |
| PgU | Vint − Vdd |
| NgU | Vint + Vdd |
| NgD | Vint |

The potential value obtained by the charge pump circuit 10 allow the correct turning on of the latch transistors MpU and MnU connected to the nodes Up and turning off of the latch transistors MpD and MnD connected to the nodes Down, and especially for the whole period in which the charge sharing between the capacitors connected to the nodes Up occurs.

The same conditions occur in the dual case of charge sharing of the pump capacitors connected to the nodes Down, during a successive charge sharing period, obtaining the potential values shown in Table 3.

TABLE 3

| PgD | Vint − Vdd |
| PgU | Vint |
| NgU | Vint |
| NgD | Vint + Vdd |

In this way, the charge pump circuit according to this embodiment of the present invention also operates correctly for supply voltages Vdd having values near the threshold voltage value of the transistors, such as equal to 1V.

In substance, the control transistors Mp1 and Mp2 (and respectively Mn1 and Mn2) in the stabilization stage 20 allow the respective biasing capacitors Cbp1 and Cbp2 (and respectively Cbn1 and Cbn2) to update with respect to the voltage at the node they refer to and to recover that charge lost for correctly driving the latch transistors.

These biasing capacitors generate the voltages that drive the gate terminals of the latch transistors, substantially acting as bootstrap capacitances.

Figure 8:
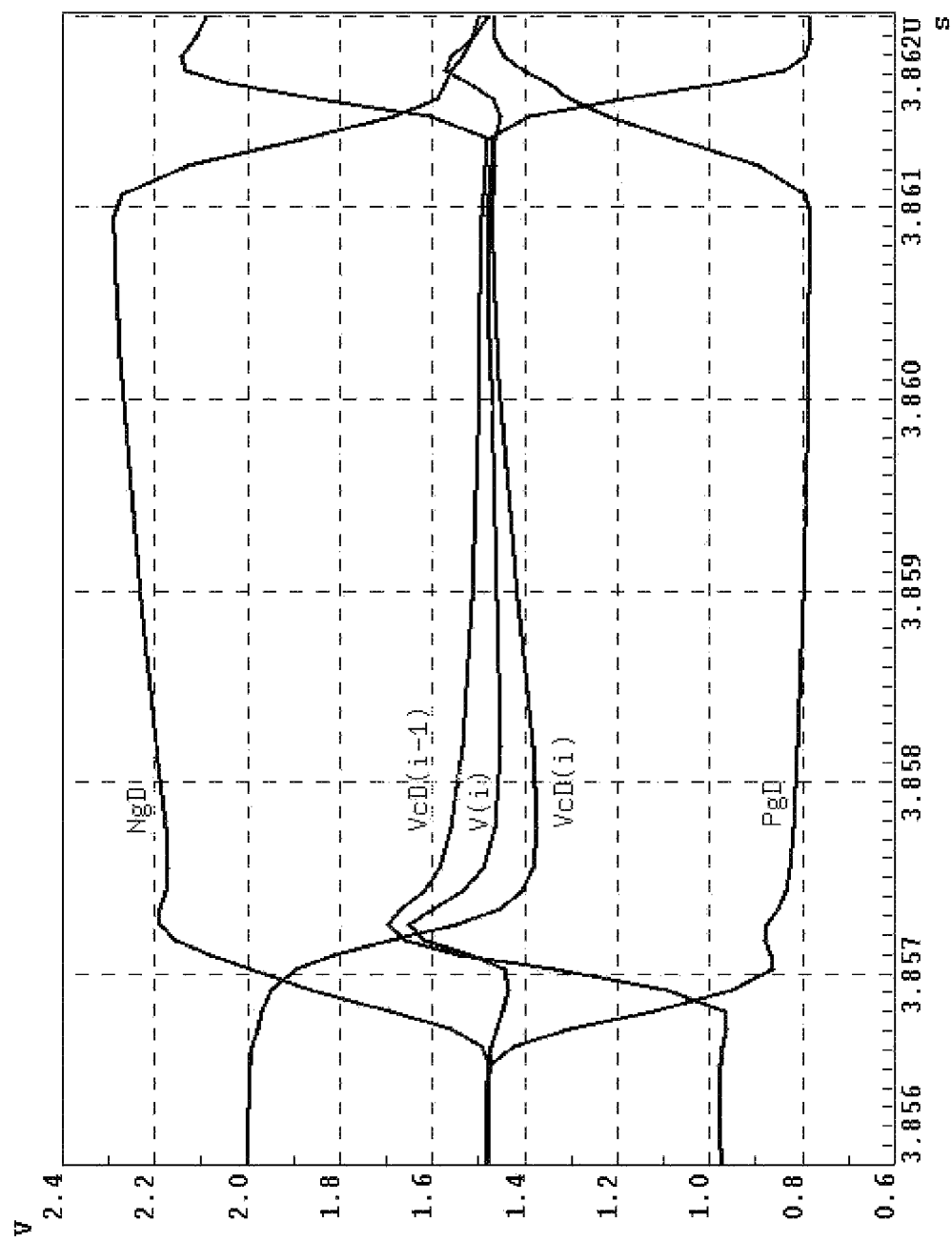
FIG. 8 shows signals inside the circuit of FIG. 7.

The inner voltage values of the charge pump circuit 10 for Vdd=1V are shown in FIG. 8.

Figure 9:
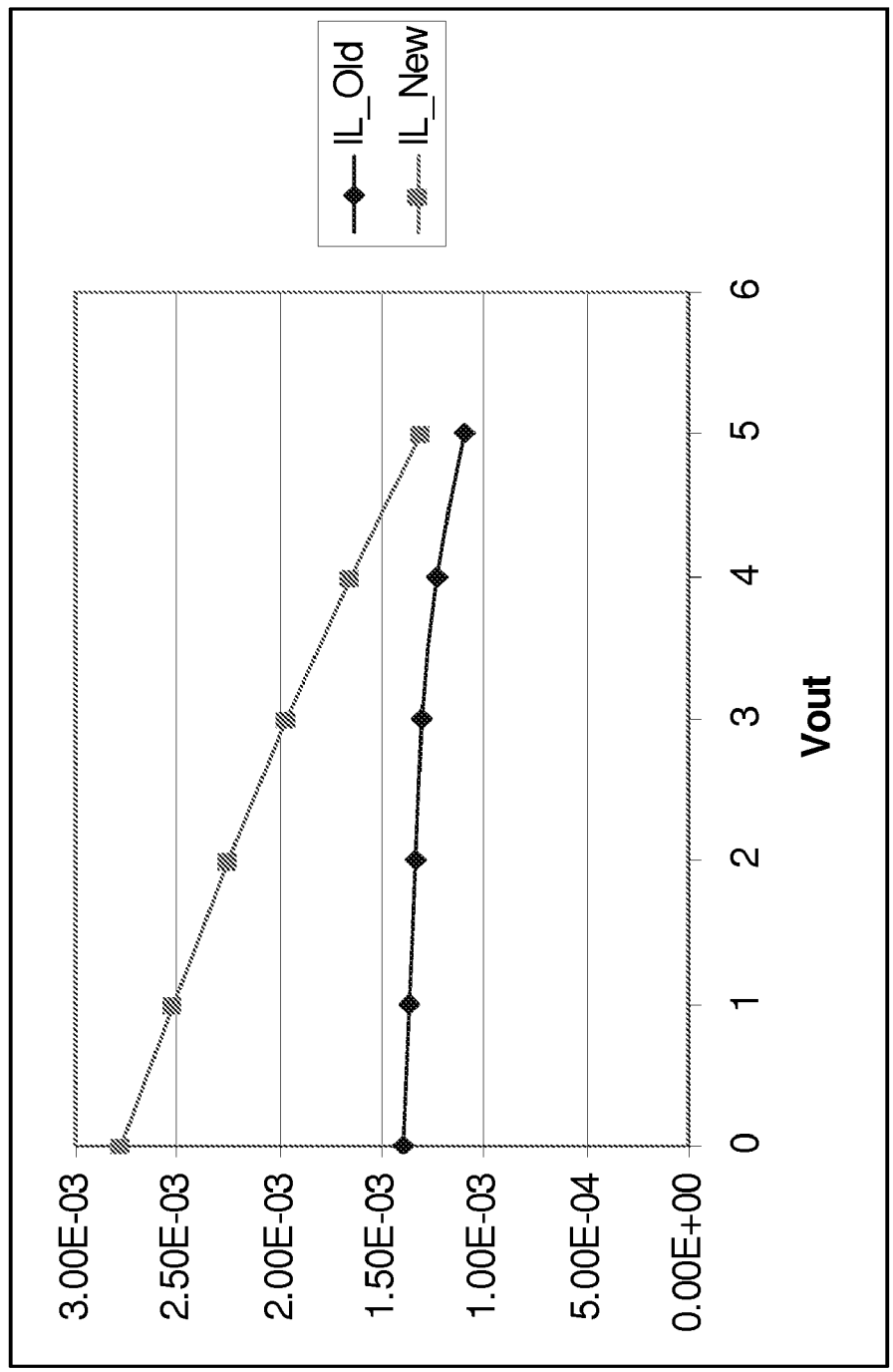
FIG. 9 shows current-voltage characteristics of the circuit of FIG. 2 and the circuit of FIG. 7.

The output voltage-current characteristic of the charge pump circuit 10, due to the stabilization stage 20, improves significantly and also retakes its linearity, as shown in FIG. 9 in a comparison with the current-voltage characteristic of the known charge pump circuit.

However, it occurs that the charge pump circuit 10 suffers, as did the known circuit, from the problems linked to the impossibility of creating phases FX and FN that are perfectly crossed with each other.

Figure 10:
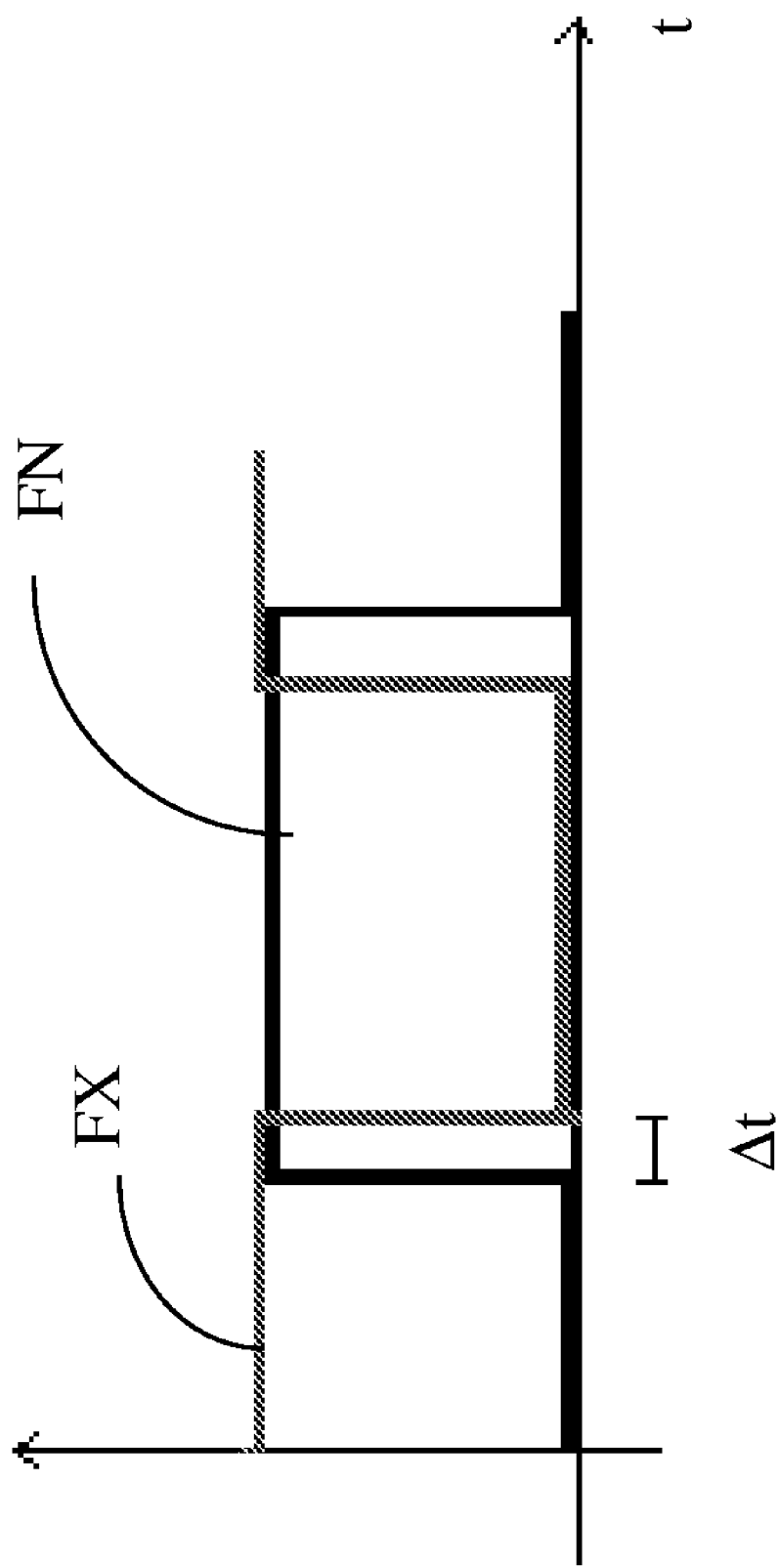
FIG. 10 shows phase signals for the circuit of FIG. 7.

A real situation for these phases is that shown in FIG. 10, where the phases FX and FN are overlapped for an overlap period Δt.

For a better understanding the roots of the problems linked to this overlap period Δt, the inner signals of the charge pump circuit 10 will be analyzed under different operating conditions.

The instant at which the first phase FX goes to a high value, equal to the supply voltage Vdd, the charge sharing period of the pump capacitors connected to the nodes Up should start. In reality, due to the delay experienced by the second phase FN to go to a low value, in particular to zero (ground), a correct charge sharing is not obtained since the transistors of the latch circuits of the charge pump stages during the overlap period Δt are not under the correct conditions for charge sharing and, in particular, they are all under turn-off conditions.

Under these conditions, there is no charge passage from the pump capacitor CUpi-1 connected to the node Upi-1 to the pump capacitor CUpi connected to the node Upi, as desired, but from the pump capacitor CDowni connected to the node Downi and from the biasing capacitors Cbn1 and Cbn2 connected to the nodes NgU and NgD, respectively, to the pump capacitor CUpi connected to the node Upi.

Figure 11:
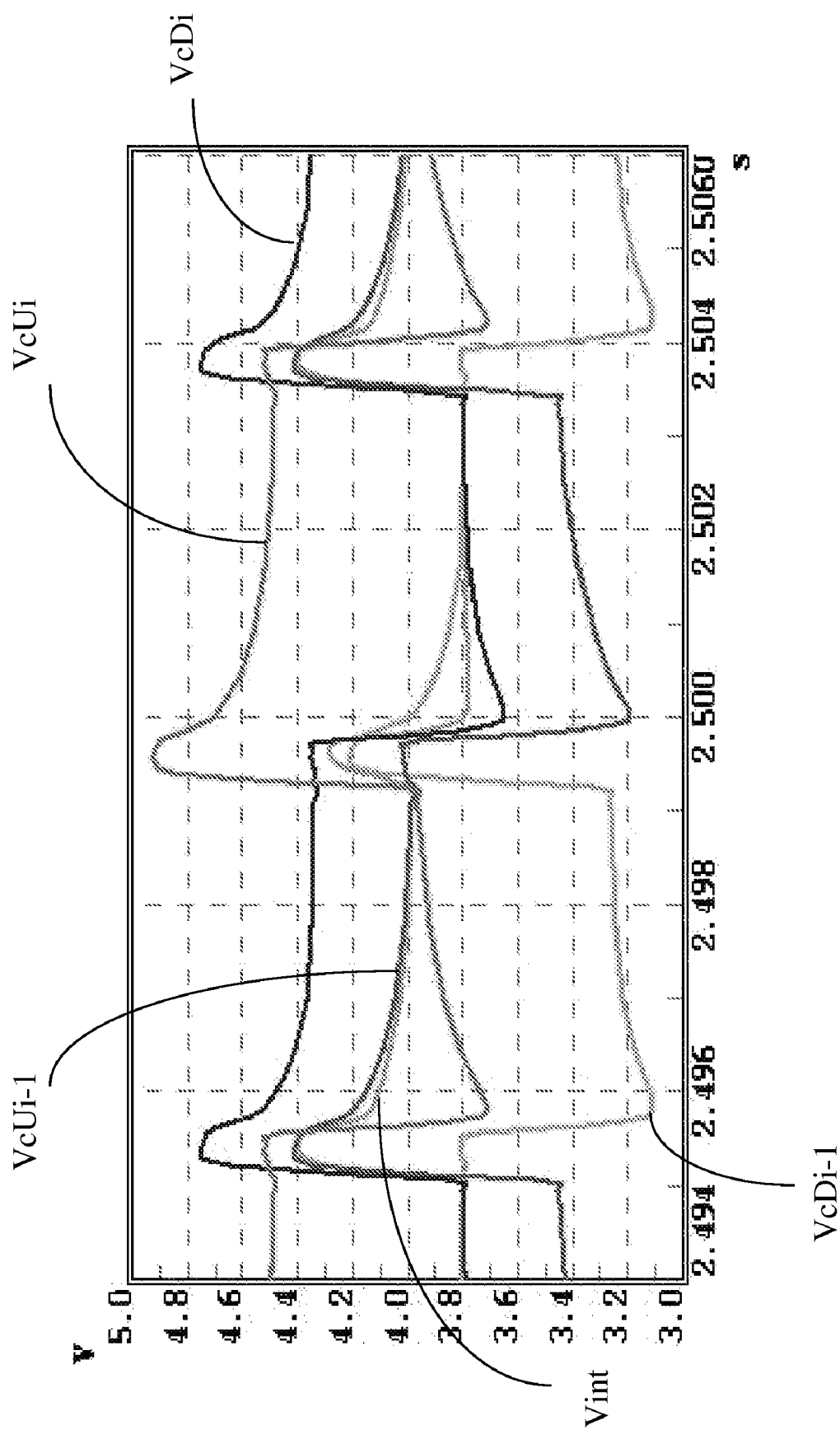
FIG. 11 shows signals inside the circuit of FIG. 7 when the phase signals of FIG. 10 are applied.

This pump capacitor CUpi thus receives more charge than the amount received by the pump capacitor CDowni connected to the node Downi in the successive period and thus this behavior leads to an asymmetry in the charge sharing as shown in FIG. 11, and thus to a wrong behavior of the charge pump circuit 10.

Figure 12:
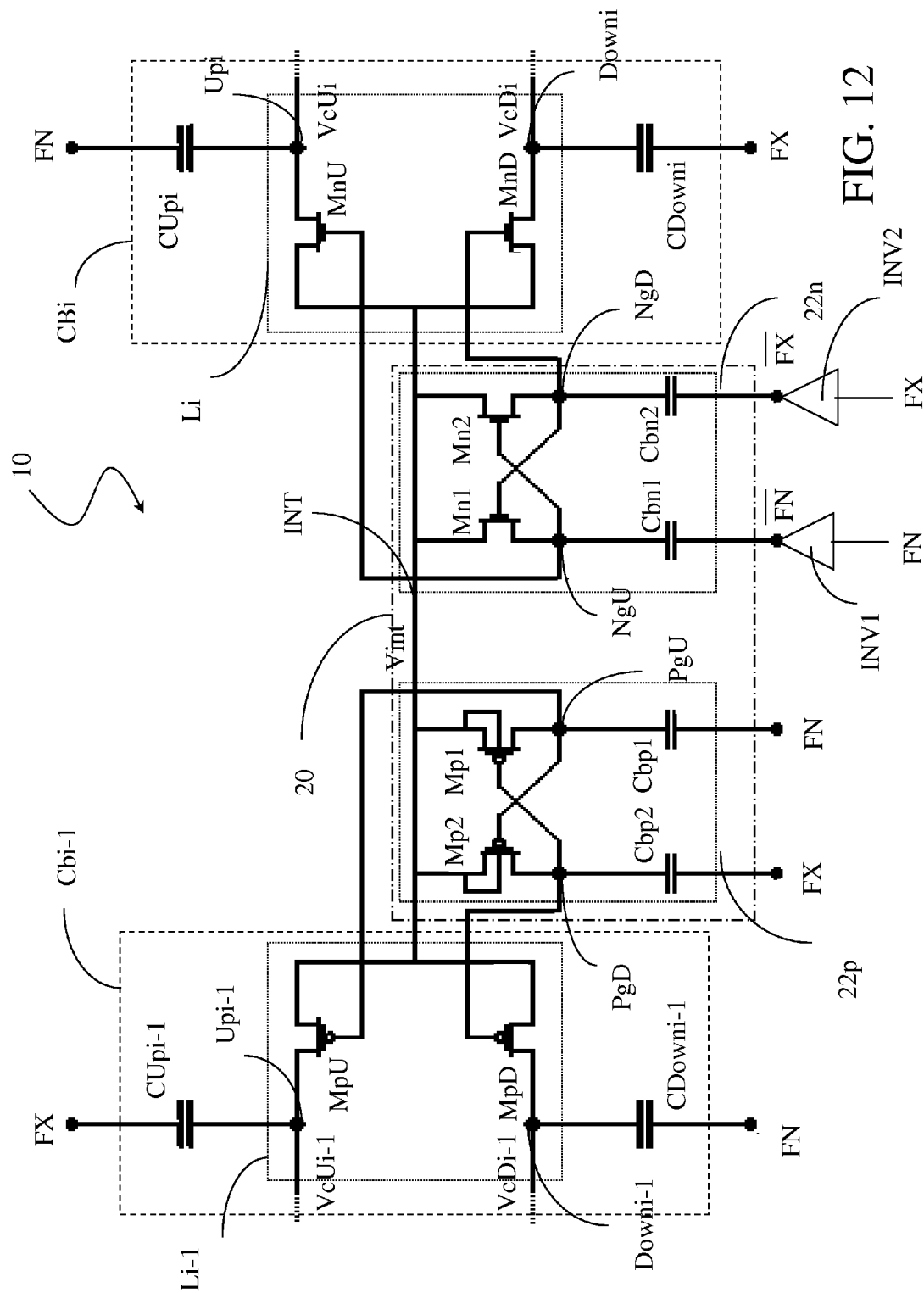
FIG. 12 shows a charge pump circuit according to an alternative embodiment of the present invention.

A charge pump circuit 10 according to another embodiment of the present invention is shown in FIG. 12. This embodiment is able to overcome this problem.

In particular, the charge pump circuit of FIG. 12 has a structure similar to the charge pump circuit of FIG. 7, and further comprises first INV1 and second INV2 logic inverters connected between the enable terminals FX and FN and the biasing capacitors Cbn1 and Cbn2 of the second portion 22n of the stabilization stage 20, for supplying signals in an inverted way with respect to the configuration of FIG. 7.

In particular, the third biasing capacitor Cbn1 is connected through the first inverter INV1 to the first enable terminal FN so as to receive the complement of the first phase FN, while the fourth biasing capacitor Cbn2 is connected through the second inverter INV2 to the second enable terminal FX so as to receive the complement of the second phase FX.

In this way, advantageously according to this embodiment of the present invention, the third and fourth control transistors Mn1 and Mn2 are suitably driven by the complements of the phases FX and FN, so as to remain off during the overlap period Δt, thus also forcing the fourth latch transistor MnD into the off condition.

In this way, a correct charge sharing is ensured, even if the turn-on of the first and third latch transistors MpU and MnU occurs only after the end of the overlap period Δt so as to reduce the sharing period, without introducing particular drawbacks for the operation of the charge pump circuit.

The above indicated situation also occurs in the case of non-overlap of the phases FX and FN, although it relates to the control transistors Mp1 and Mp2 of the first portion 22p of the stabilization 20 stage. The embodiment of FIG. 12 thus also solves the problems linked to the case of non-overlap.

Figure 13:
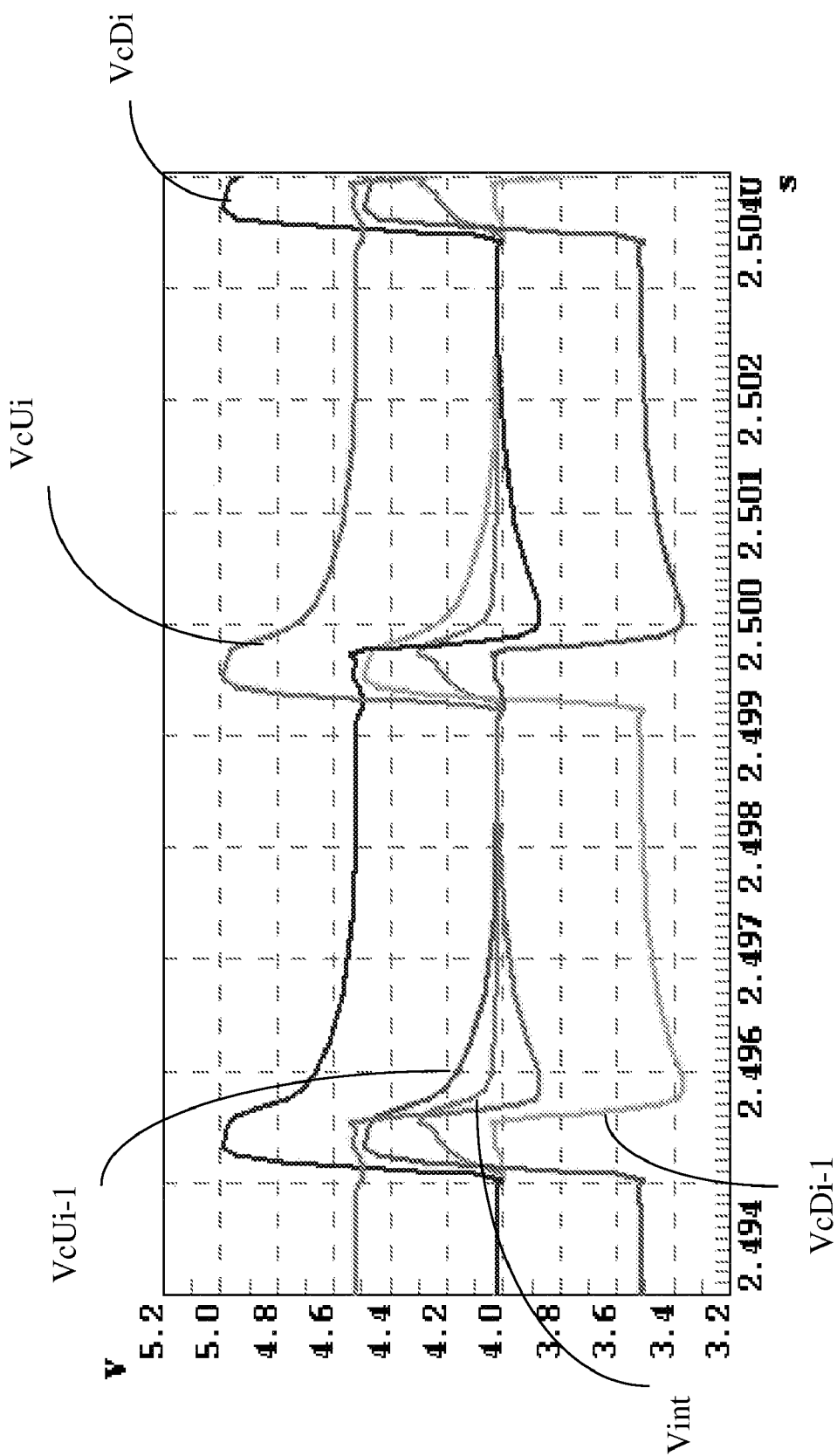
FIG. 13 shows signals inside the circuit of FIG. 12.

Simulations carried out on the charge pump circuit 10 of FIG. 12 show how any problem of asymmetry in the charge sharing has been solved. The results of these simulations are shown in FIG. 13.

Accordingly, the charge pump circuit according to the present invention allows efficient biasing of the control terminals of the transistors of the latch circuits of the charge pump stages, for the whole duration of the semi-periods in which charge sharing occurs. This allows these charge pump circuits not to be over-sized so as to meet the specifications, but to size them according to the law characterizing their typical behavior.

In a real circuit, the well known body effect is to be taken into account, which tends to make the threshold voltage of the transistors increase, so as to reduce the potentialities of the charge pump circuit 10.

Moreover, considering that PMOS transistors have been used as pass-transistors for charge sharing among the charge pump stages CBi, in particular the transistors MpU and MpD, the "latchup" phenomenon also is to be taken into account,
being triggered by the parasitic transistors due to the junctions pnpn contained in the CMOS structures as the latch circuits Li.

Figure 14:
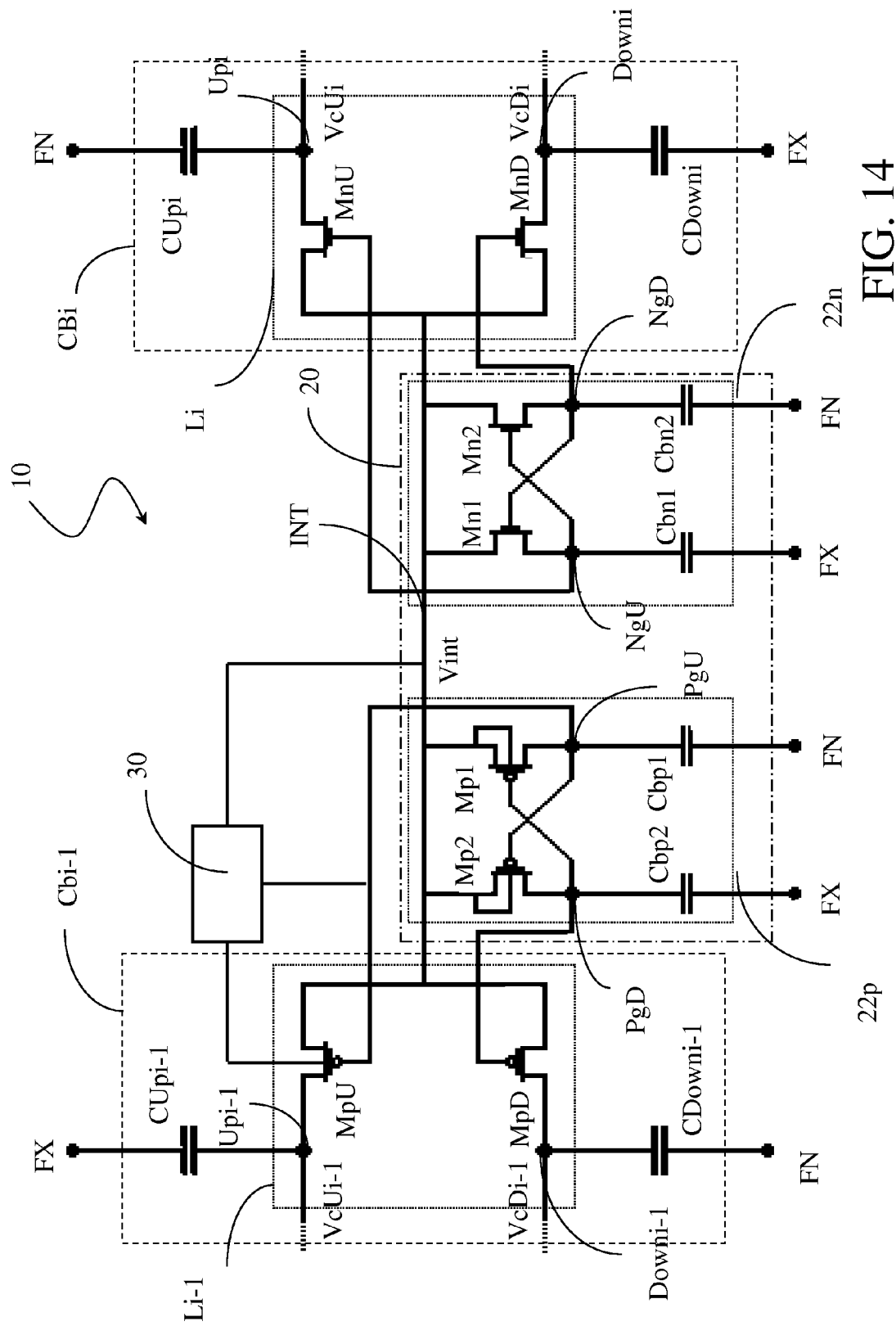
FIG. 14 shows a charge pump circuit according to another alternative embodiment of the present invention.

A charge pump circuit according to another embodiment of the present invention is shown in FIG. 14. This embodiment is able to dynamically bias the bulk terminals of the PMOS transistors to avoid the above-indicated problems.

In particular, according to this embodiment, the charge pump circuit 10 comprises dynamic bulk biasing blocks 30 connected to the bulk terminals of the PMOS transistors and suitable for maintaining them, instant by instant, at a maximum voltage value applied to the latch circuit Li so as to avoid the turn-on of the parasitic transistors.

For simplicity of illustration, FIG. 14 only shows a bulk dynamic biasing block 30 connected to the bulk terminal of the latch transistor MpU. In a similar way, the charge pump circuit 10 is provided with a plurality of bulk dynamic biasing blocks 30, with one being connected to a bulk terminal of each PMOS transistor.

Figure 15:
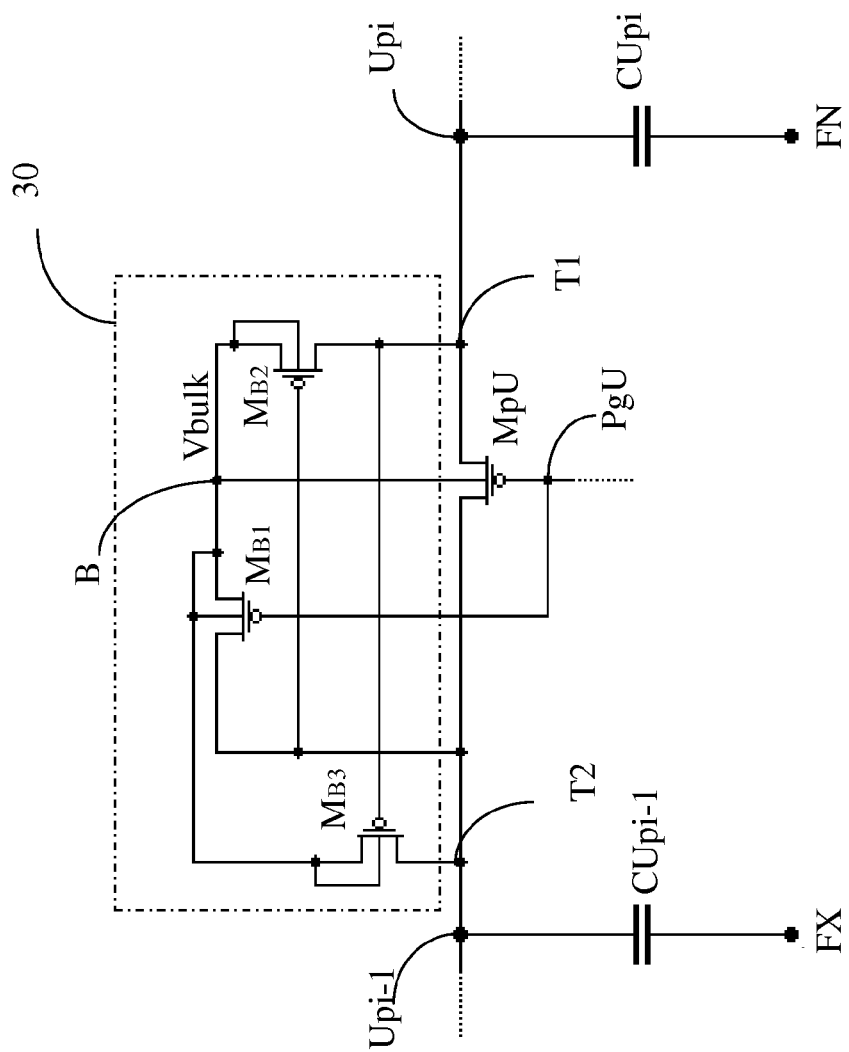
FIG. 15 shows an exemplary embodiment of a portion of the charge pump circuit of FIG. 14.

An exemplary embodiment of a bulk dynamic biasing block 30 is shown in FIG. 15, which shows, in a simplified way, the pump capacitors CUpi-1 and CUpi connected to each other by the latch transistor MpU as well as to the enable terminals FX and FN, respectively. The latch transistor MpU has a first conduction terminal T1 connected to a first node Upi-1 where there is a first voltage VUpi-1, a second conduction terminal T2 connected to a second node Upi where there is a second voltage VUpi, and a control (or gate) terminal connected to the central node PgU.

These first and second conduction terminals T1 and T2 are drain and source terminals (and respectively source and drain terminals) of the latch transistor MpU under charge sharing conditions (and respectively charge no sharing conditions).

As shown, the bulk dynamic biasing block 30 comprises a first bulk biasing transistor $M_{B1}$ connected between a bulk terminal B and the first conduction terminal T1 (and thus the first node Upi-1) of the latch transistor MpU and having a bulk terminal connected to this bulk terminal B and a control (or gate) terminal connected to the central node PgU (and thus to the gate terminal of the latch transistor MpU), and a second bulk biasing transistor MB2 connected between the bulk terminal B and the second conduction terminal T2 (and thus the second node Upi) of the latch transistor MpU and having a bulk terminal connected to the bulk terminal B and a control (or gate) terminal connected to the conduction terminal T1 (and thus to the first node Upi-1).

The bulk dynamic biasing block 30 further comprises a third bulk biasing transistor MB3 connected between the bulk terminal B and the first conduction terminal T1 (and thus the first node Upi-1) of the latch transistor MpU and having a bulk terminal connected to the bulk terminal B and a control (or gate) terminal connected to the second conduction terminal T2 (and thus to the second node Upi).

The bulk dynamic biasing block 30 operates according to the following conditions.

FX=Vdd, FN=0 and thus VUpi-1>VUpi: In this case the first bulk biasing transistor $M_{B1}$ is turned on by the same mechanism turning on the transistor MpU, thus bringing the voltage VBulk on the bulk node B to a value equal to VUpi-1. Advantageously, this voltage value VUpi-1 is the highest voltage applied, under this condition, to the latch circuit Li-1.

FX=0, FN=Vdd and thus VUpi-1<VUpi: In this case the transistor MpU is off (and also the first bulk biasing transistor $M_{B1}$), while the second bulk biasing transistor MB2 is on and brings the voltage VBulk to a value equal to VUpi.

The condition in which VUpi<<VUpi-1 is also to be considered, for example in the case in which the output terminal OUT of the charge pump circuit 10 is connected to a very capacitive node having a voltage near zero.

Under this condition, the second bulk biasing transistor MB2 cannot be turned on. Advantageously, the bulk dynamic biasing block 30 also comprises the third bulk biasing transistor MB3 which latches, when the first bulk biasing transistor $M_{B1}$ is off, the voltage VBulk at a value equal to VUpi-1 and avoids that the same remains floating.

It is possible to summarize the operating conditions of the bulk dynamic biasing block 30 as follows in Table 4.

TABLE 4

| FX | FN | | VBulk |
|----|----|----|-------|
| Vdd | 0 | VUpi-1 > VUpi | VUpi-1 |
| 0 | Vdd | VUpi-1 < VUpi | VUpi |
| — | — | VUpi << VUpi-1 | VUpi-1 |

Advantageously, charge pump circuits according to the present invention show an improved capacity for generating current and, at the same time, ensure a linear behavior of the charge pump stages, even similar to charge pumps of the Bootstrap type, while maintaining the possibility of operating at frequencies that can also reach 150 MHz, and thus using much smaller pump capacitors with respect to known circuits.

The price to be paid for achieving these results is the sole area increase due to the addition of the stabilization stage (i.e., of four transistors and four bootstrap capacitors between each pair of stages), and the relative increase in current consumption.

Charge pump circuits according to the present invention advantageously solve the problems linked to the body effect and to the latch-up phenomena affecting CMOS structures, ensuring a correct dynamic biasing of the bulk terminals of the PMOS transistors.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A latch-type charge pump circuit including at least one first charge pump stage coupled to at least one second charge pump stage by an intermediate circuit node, the charge pump circuit comprising:
    a first pump capacitor coupled between a first enable terminal and a first inner circuit node;
    a second pump capacitor coupled between a second enable terminal and a second inner circuit node, the first and second enable terminals receiving phase signals that are complementary to one another;
    a third pump capacitor coupled between the second enable terminal and a third inner circuit node;
    a fourth pump capacitor coupled between the first enable terminal and a fourth inner circuit node;
    a first latch transistor coupled between the first inner circuit node and the intermediate circuit node;
    a second latch transistor coupled between the second inner circuit node and the intermediate circuit node;
    a third latch transistor coupled between the third inner circuit node and the intermediate circuit node;
    a fourth latch transistor coupled between the fourth inner circuit node and the intermediate circuit node; and
    a stabilization circuit including at least one stabilization stage coupled between the intermediate circuit node and the first and second enable terminals, the at least one stabilization stage being coupled to control terminals of the first, second, third, and fourth latch transistors for supplying these latch transistors with suitable control signals so as to ensure correct turn-on and turn-off during a charge sharing period of the charge pump circuit.

2. The charge pump circuit according to claim 1, wherein the stabilization stage comprises:
    at least one first biasing portion connected to the control terminals of the first and third latch transistors; and
    at least one second biasing portion connected to the control terminals of the second and fourth latch transistors.

3. The charge pump circuit according to claim 2, wherein the first biasing portion comprises:
    a first biasing capacitor coupled between the control terminal of the first latch transistor and the second enable terminal; and
    a second biasing capacitor coupled between the control terminal of the third latch transistor and the first enable terminal, and
    the second biasing portion comprises:
    a third biasing capacitor coupled between the control terminal of the second latch transistor and the first enable terminal; and
    a fourth biasing capacitor coupled between the control terminal of the fourth latch transistor and the second enable terminal.

4. The charge pump circuit according to claim 3, wherein the first biasing portion further comprises:
    a first control transistor coupled between the intermediate circuit node and the control terminal of the first latch transistor, and having a control terminal connected to the control terminal of the third latch transistor; and
    a second control transistor coupled between the intermediate circuit node and the control terminal of the third latch transistor, and having a control terminal connected to the control terminal of the first latch transistor, and
    the second biasing portion further comprises:
    a third control transistor coupled between the intermediate circuit node and the control terminal of the second latch transistor, and having a control terminal connected to the control terminal of the fourth latch transistor; and
    a fourth control transistor coupled between the intermediate circuit node and the control terminal of the fourth latch transistor, and having a control terminal connected to the control terminal of the second latch transistor.

5. The charge pump circuit according to claim 4, wherein each of the control transistors is of the same type as the latch transistor to which its control terminal is connected.

6. The charge pump circuit according to claim 4, wherein the first and second control transistors and the first and third latch transistors are P-channel MOS transistors.

7. The charge pump circuit according to claim 4, wherein the third and fourth control transistors and the second and fourth latch transistors are N-channel MOS transistors.

8. The charge pump circuit according to claim 3, further comprising:
a first inverter connected between the second enable terminal and the third biasing capacitor, so as to supply the third biasing capacitor with the complement of the second phase signal; and
a second inverter connected between the first enable terminal and the fourth biasing capacitor, so as to supply the fourth biasing capacitor with the complement of the first phase signal.

9. The charge pump circuit according to claim 1,
wherein the charge pump circuit comprises a plurality of charge pump stages, and
the stabilization circuit comprises a plurality of stabilization stages, each of the stabilization stages being coupled between two adjacent charge pump stages.

10. The charge pump circuit according to claim 1, further comprising:
a plurality of bulk dynamic biasing blocks, each of the bulk dynamic biasing blocks being connected to a bulk terminal of one of the latch transistors of the PMOS type.

11. The charge pump circuit according to claim 10, wherein the bulk dynamic biasing block comprises:
a first bulk biasing transistor coupled between the bulk terminal and a first conduction terminal of the one latch transistor, and having a bulk terminal connected to the bulk terminal of the one latch transistor and a control terminal connected to the control terminal of the one latch transistor; and
a second bulk biasing transistor coupled between the bulk terminal and a second conduction terminal of the one latch transistor, and having a bulk terminal connected to the bulk terminal of the one latch transistor and a control terminal connected to the first conduction terminal of the one latch transistor.

12. The charge pump circuit according to claim 11, wherein the bulk dynamic biasing block further comprises a third bulk biasing transistor coupled between the bulk terminal and the first conduction terminal of the one latch transistor, and having a bulk terminal connected to the bulk terminal of the one latch transistor and a control terminal connected to the second conduction terminal of the one latch transistor.

13. An integrated circuit including at least one latch-type charge pump circuit, the charge pump circuit comprising:
a first pump capacitor coupled between a first enable terminal and a first inner circuit node;
a second pump capacitor coupled between a second enable terminal and a second inner circuit node, the first and second enable terminals receiving phase signals that are complementary to one another;
a third pump capacitor coupled between the second enable terminal and a third inner circuit node;
a fourth pump capacitor coupled between the first enable terminal and a fourth inner circuit node;
a first latch transistor coupled between the first inner circuit node and an intermediate circuit node;
a second latch transistor coupled between the second inner circuit node and the intermediate circuit node;
a third latch transistor coupled between the third inner circuit node and the intermediate circuit node;
a fourth latch transistor coupled between the fourth inner circuit node and the intermediate circuit node; and
a stabilization circuit including at least one stabilization stage coupled between the intermediate circuit node and the first and second enable terminals, the at least one stabilization stage being coupled to control terminals of the first, second, third, and fourth latch transistors for supplying these latch transistors with suitable control signals so as to ensure correct turn-on and turn-off during a charge sharing period of the charge pump circuit.

14. The integrated circuit according to claim 13, wherein the stabilization stage of the charge pump circuit comprises:
at least one first biasing portion connected to the control terminals of the first and third latch transistors; and
at least one second biasing portion connected to the control terminals of the second and fourth latch transistors.

15. The integrated circuit according to claim 14,
wherein the first biasing portion comprises:
a first biasing capacitor coupled between the control terminal of the first latch transistor and the second enable terminal; and
a second biasing capacitor coupled between the control terminal of the third latch transistor and the first enable terminal, and
the second biasing portion comprises:
a third biasing capacitor coupled between the control terminal of the second latch transistor and the first enable terminal; and
a fourth biasing capacitor coupled between the control terminal of the fourth latch transistor and the second enable terminal.

16. The integrated circuit according to claim 15,
wherein the first biasing portion further comprises:
a first control transistor coupled between the intermediate circuit node and the control terminal of the first latch transistor, and having a control terminal connected to the control terminal of the third latch transistor; and
a second control transistor coupled between the intermediate circuit node and the control terminal of the third latch transistor, and having a control terminal connected to the control terminal of the first latch transistor, and
the second biasing portion further comprises:
a third control transistor coupled between the intermediate circuit node and the control terminal of the second latch transistor, and having a control terminal connected to the control terminal of the fourth latch transistor; and
a fourth control transistor coupled between the intermediate circuit node and the control terminal of the fourth latch transistor, and having a control terminal connected to the control terminal of the second latch transistor.

17. The integrated circuit according to claim 15, wherein the charge pump circuit further comprises:
a first inverter connected between the second enable terminal and the third biasing capacitor, so as to supply the third biasing capacitor with the complement of the second phase signal; and
a second inverter connected between the first enable terminal and the fourth biasing capacitor, so as to supply the fourth biasing capacitor with the complement of the first phase signal.

18. The integrated circuit according to claim 13,
wherein the charge pump circuit comprises a plurality of charge pump stages, and
the stabilization circuit of the charge pump circuit comprises a plurality of stabilization stages, each of the stabilization stages being coupled between two adjacent charge pump stages.

19. The integrated circuit according to claim 13,
wherein the charge pump circuit further comprises a plurality of bulk dynamic biasing blocks, each of the bulk dynamic biasing blocks being connected to a bulk terminal of one of the latch transistors of the PMOS type, and the bulk dynamic biasing block comprises:

a first bulk biasing transistor coupled between the bulk terminal and a first conduction terminal of the one latch transistor, and having a bulk terminal connected to the bulk terminal of the one latch transistor and a control terminal connected to the control terminal of the one latch transistor; and a second bulk biasing transistor coupled between the bulk terminal and a second conduction terminal of the one latch transistor, and having a bulk terminal connected to the bulk terminal of the one latch transistor and a control terminal connected to the first conduction terminal of the one latch transistor.

* * * * *